March 29, 1966     H. L. THOMPSON     3,242,872
WATER SUPPLY INLET STRUCTURES
Filed Nov. 19, 1962     4 Sheets-Sheet 1

INVENTOR.
HENRY L. THOMPSON
BY
BUCKHORN, BLORE, KLARQUIST & SPARKMAN
ATTORNEYS

March 29, 1966

H. L. THOMPSON 3,242,872

WATER SUPPLY INLET STRUCTURES

Filed Nov. 19, 1962

*INVENTOR.*
HENRY L. THOMPSON

BY

BUCKHORN, BLORE, KLARQUIST & SPARKMAN
ATTORNEYS

March 29, 1966  H. L. THOMPSON  3,242,872
WATER SUPPLY INLET STRUCTURES
Filed Nov. 19, 1962  4 Sheets-Sheet 3

INVENTOR.
HENRY L. THOMPSON
BY
BUCKHORN, BLORE, KLARQUIST & SPARKMAN
ATTORNEYS

March 29, 1966 H. L. THOMPSON 3,242,872
WATER SUPPLY INLET STRUCTURES

Filed Nov. 19, 1962 4 Sheets-Sheet 4

INVENTOR.
HENRY L. THOMPSON
BY
BUCKHORN, BLORE, KLARQUIST & SPARKMAN
ATTORNEYS

United States Patent Office 3,242,872
Patented Mar. 29, 1966

3,242,872
WATER SUPPLY INLET STRUCTURES
Henry L. Thompson, Portland, Oreg., assignor to Chain Belt Company, Milwaukee, Wis., a corporation of Wisconsin
Filed Nov. 19, 1962, Ser. No. 238,651
2 Claims. (Cl. 103—220)

This invention relates to water supply inlet structures for drawing screened water, and more particularly to self-cleaning screens for water supply inlets for screening a water supply.

An object of the invention is to provide a new and improved structure for taking screened water from bodies of water.

Another object of the invention is to provide a water supply inlet structure having a screen which may be easily repaired and maintained.

A further object of the invention is to provide a new and improved rotating screen structure for a water supply which effectively cleans itself.

Another object of the invention is to provide a new and improved structure for mounting and revolving a screen of a water supply inlet.

Another object of the invention is to provide a new and improved scrubbing structure of a screen for a water supply inlet.

Another object of the invention is to provide simple, rugged, inexpensive screening structures for water supply inlets.

A further object of the invention is to provide a simple, effective structure for supporting a revolving screen of a water supply inlet.

A complete understanding of the invention may be obtained from the following detailed description of water supply inlet structures for drawing screened water forming specific embodiments thereof, when read in conjunction with the appended drawings, in which.

Figure 1:
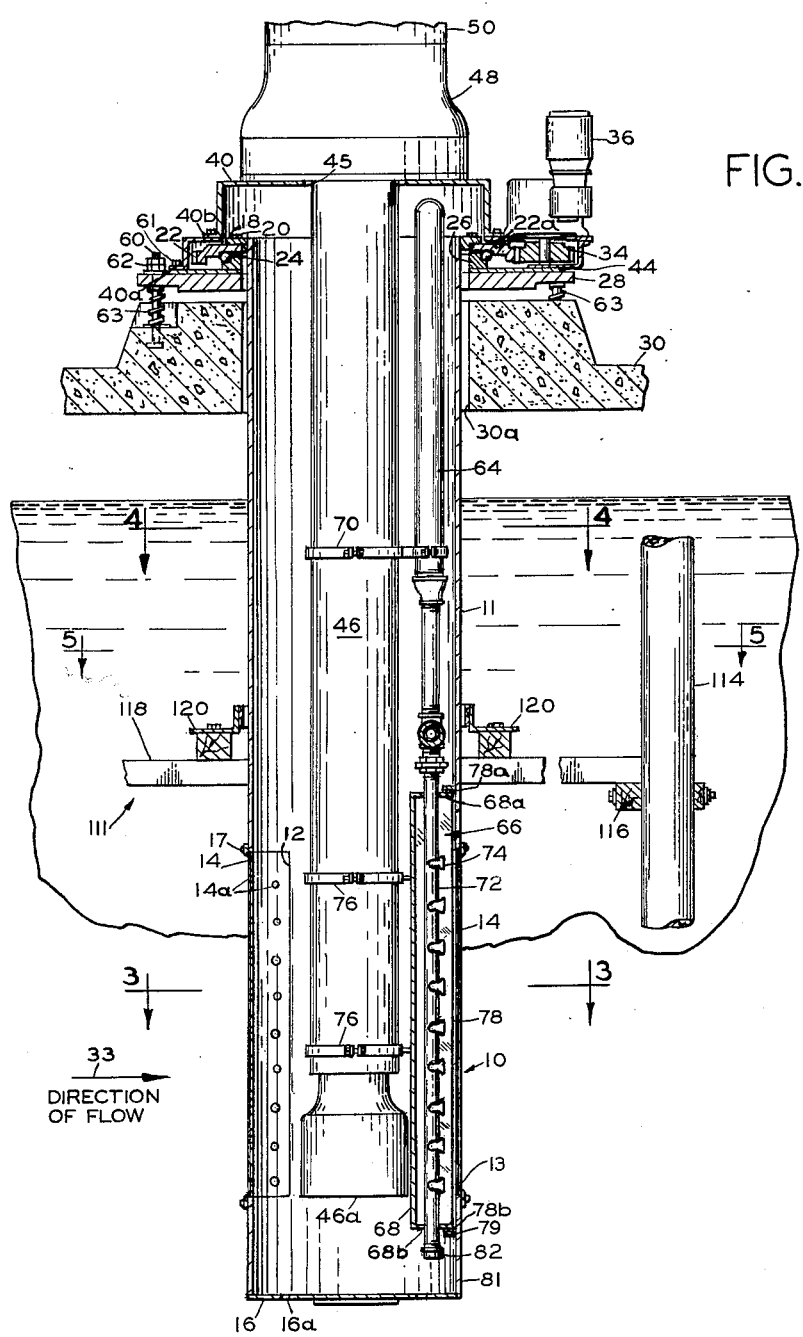
FIG. 1 is a fragmentary, vertical, sectional view of a water supply inlet structure forming one embodiment of the invention.

The invention provides for drawing screened water and a water supply inlet structure having a cylindrical revolving screen and preferably also provided with jet cleaning means positioned inside the revolving screen and which cleaning means may be mounted on a pump inlet pipe extending into the chamber defined by the revolving screen. There may also be provided a cup-shaped shield surrounding the jets and having an opening on the downstream side of the screen whereby the screen serves to keep debris or material washed from the screen by the jets from entering the screen chambers, the shield acting as a baffle between the area of the screen being scrubbed and the pump inlet. A pump also may be mounted above the revolving screen on a support such as a pier platform or the like and the pump inlet and the jet scrubbing device along with the shield may all be lifted out of the screen as a unit for maintenance and repair. Preferably the screen is provided at its upper end with a radial and thrust bearing supported by the support and driven by a pinion and ring gear drive carried by the support and the screen respectively, with another bearing positioned downwardly on the screen and which may be carried by the pump inlet pipe itself.

Referring now in detail to the drawings, the water supply inlet structure shown in FIGS. 1-4 includes a cylindrical screen 10 comprising a rigid stainless steel pipe or shaft 11 imperforate along its upper portion and having near its lower end portion openings 12 to form an open framework 13 to which arcuate screen sections or segments 14 are secured and which is closed at its lower end by a disc 16. The segments 14 are perforated sheets having holes 14a to admit water to the interior of the screen 10. Preferably the segments are punched sheets of stainless steel having one-quarter inch diameter openings on five-sixteenth inch centers so that larger debris will be screened out. The segments 14 are cupped or drawn around the edges so that the segments fit into the openings 12 with the inner surfaces of the segments flush with and forming continuations of the inner periphery of the pipe 11. The segments 14 have outer flanges 14b secured to the pipe 11 by screws 17. The disc 16 has drain holes 16a. The upper end of the pipe 11 is brazed or welded to a flanged ring 18 which is fixed as by cap screws 20 to an annular ring gear 22 which has an outer race portion 22a formed thereon and is supported both for axial thrust and radial thrust by balls 24 supported in an inner race member 26 which is fixed to an annular supporting plate 28 resiliently mounted on a platform or support 30 of a pier positioned above a body of water 31 from which water is to be pumped and having a current flow in the direction indicated by the arrow 33 in FIG. 1. The pipe extends downwardly and loosely through a cylindrical hole 30a formed in the platform 30. The ring gear 22 and the upper end of the pipe 11 are thus supported both against radial movement and longitudinal movement downwardly by the bearing structure including the race 22a, the race member 26 and the balls 24. A pinion 34 driven by an electric motor 36 rotates the ring gear 22 and the screen 10 about the centerline of the screen 10.

Figure 2:
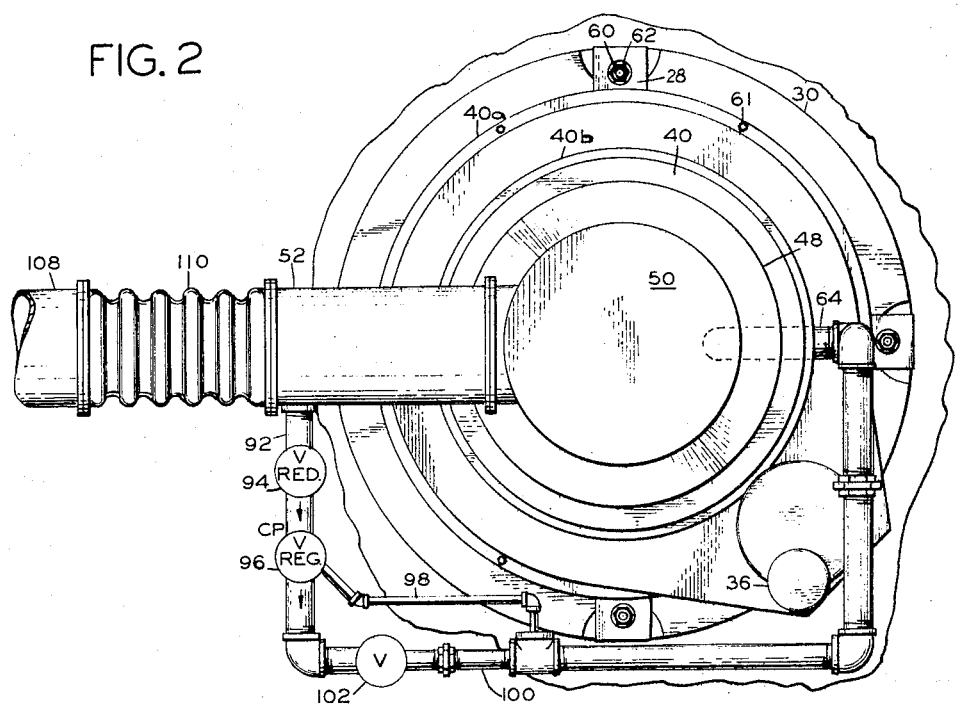
FIG. 2 is an enlarged, fragmentary, top plan view of the structure of FIG. 1.

A cup-shaped housing member 40 having upper and lower portions encloses the upper end of the screen 10 and the ring gear 22 and has a flange 40a resting on the plate 28 with a sealing gasket 44 positioned therebetween, the two portions of the housing being secured together at 40b. The upper portion of the housing 40 has an opening 45 aligned with the screen 10 and a known multistage unit or inlet pipe 46 of a pump 48 driven by an electric motor 50 of the water supply extends downwardly through the opening 45 almost to te bottom of the screen 10. The inlet pipe 46 has an open lower end or inlet 46a for drawing water into the pipe 46 when the pump 48 is driven by the motor 50 to deliver water at a high rate of flow and under substantial pressure through a pump outlet or discharge pipe 52 (FIG. 2). The housing 40 is secured by cap screws 61 to the plate 28. The plate 28 is mounted for vertical sliding motion on studs 60 extending upwardly from platform 30 and is held on the studs by nuts 62 forming stops. Springs 63 resiliently support the plate 28 so that the entire pump and screen assembly is mounted resiliently on the pier for limited pivotal movement relative to the pier.

A scrubber conduit 64 is mounted on the inlet pipe 46 by split clamp hangers 70 which rigidly connect the conduit 64 and pipe 46 together. The conduit 64 is divided at its lower end to define manifold pipes 72 and 73 having rows of nozzles 74 and 75, respectively, in spaced positions therealong. The nozzles 74 and 75 are spaced with their tips quite close to the lower, screening portion of the screen 10. The manifold pipes 72 and 73 have open lower ends which are closed by removable caps 82 for cleaning out the pipes when desired.

Figure 3:
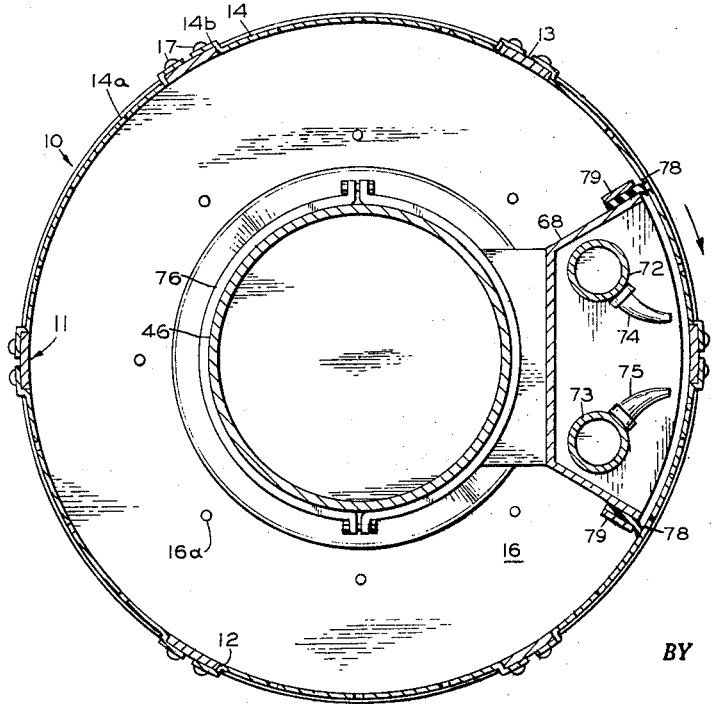
FIG. 3 is an enlarged, horizontal, sectional view taken along line 3—3 of FIG. 1.
Figure 4:
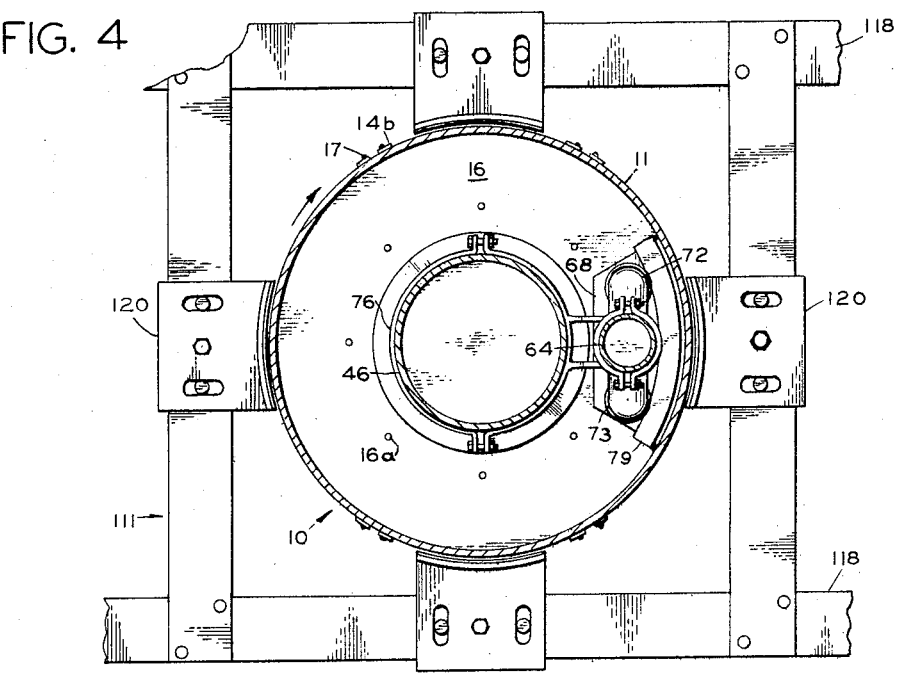
FIG. 4 is an enlarged, fragmentary, sectional view taken along line 4—4 of FIG. 1.

Partially surrounding the manifold pipes 72 and 73 is a cup-shaped shield 68 carried from the inlet pipe 46 by hangers 76. The side of the shield facing the inner surface of the screen 10 is open, as best seen in FIG. 3. Secured to the peripheral open edges of the shield 68 is a sealing strip 78 composed of neoprene or other suitable wear-resistant, tough, resilient material which sealingly engages the inner periphery of the screen. A clamping strap or band 79 fixes the strip 78 to the edge portions of the shield 68. As will be apparent, when the nuts 62 are removed from the studs 60, the pump 48, the motor 50, the inlet pipe 46 and scrubber piping or conduit 64 together with a jet scrubber 66 and the cup-shaped shield or baffle 68 all may be removed as a unit from the screen 10 for repair or maintenance.

The tips of the nozzles 74 and 75 are positioned substantially centrally between the side edges of the shield 68 as is illustrated best in FIG. 3 and squirt overlapping fan-like jets of water under substantial pressure of preferably at least 80 pounds per square inch to the central portion of the screen surrounded by the edges of the seal 78 and wash dirt and debris from the screen as the screen is revolved therepast. The nozzles 74 and 75 each form a continuous, high velocity vertical plane or sheet of water extending radially of the screen to dislodge and wash away any debris upon the screen. The nozzles 74 may be directed somewhat counter to the direction of rotation of the pipe 11 if desired. The shield 68 isolates the portion of the screen being scrubbed from the inlet 46a of the inlet pipe 46 so that the material scrubbed and dislodged from the screen by the turbulent jets applied by the nozzles is not pumped into the inlet pipe 46. Also, the top and bottom edges 78a and 78b of the sealing strip bear against imperforate portions of the pipe 11 and bracket the top and bottom of the screen segments 14.

Where the water supply inlet structure is used to take water from a river, the shield structure 68 and the scrubber 66 are located on the downstream side of the screen so that any debris and sediment washed or scrubbed from the screen are carried by the natural flow of the stream on down the stream. This, plus the sealing effect of the shield 68, prevents particles and other debris from entering the inlet pipe 46. Thus, the jet scrubbing is effected at the most advantageous portion of the screen 10.

Where the screen 10 is located in a stream, the shield 68 operates to close off a section of the perforate screen on each side of the jets from nozzles 74 and 75 so that the sweep of the stream around the influent section of the screen can close-in downstream sufficiently to carry away the debris and material which is dislodged from the ports by the jets from the nozzles. Accordingly, the shield 68 should close off between one-sixth and one-fourth of the circumference of the screen. Where the screen intake is used to withdraw water from a very slow moving stream or a lake, the shield 68 will generally have to be larger to separate the intake from the outward backwash emanating from nozzles 74 and 75.

Water under the desired high pressure for the scrubbing nozzles 74 and 75 is obtained easily and with minimum piping structure from a bleeder line 92 (FIG. 2) connected to the pump discharge line 52. The bleeder line supplies water to the piping 64 through a reducing valve 94, a regulating valve 96 of a known type, controlled by a control conduit 98, a conduit member 100 and a solenoid-operated valve 102 positioned in the line 92. The valve 102 is wrapped with a known electrical resistance heater tape (not shown) which is connected to a suitable supply of electrical power (not shown) as is well known in the art to maintain the bleeder line above freezing temperature when the pump is operated during periods below freezing. As illustrated in FIG. 2, the pump outlet pipe 52 is connected to a supply pipe 108 of a water system (not shown) by a known, commercially available, resilient bellows pipe structure 110 which isolates the vibration of the pump from the supply pipe 108 and permits the combined assembly of the pump and screen elements to move within limits relative to the pipe 108.

Figure 5:
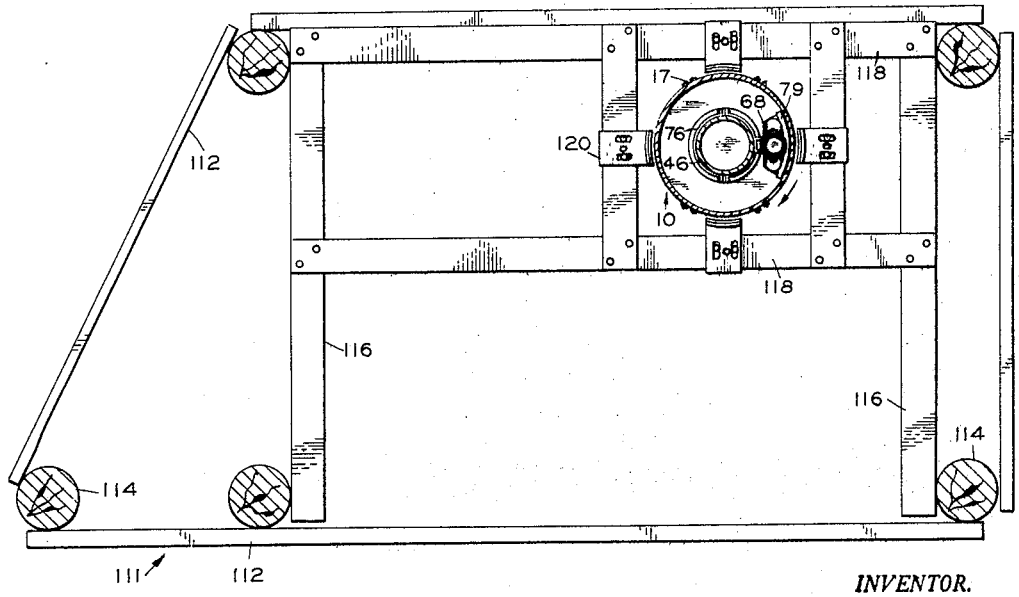
FIG. 5 is a horizontal sectional view of the water supply unit structure taken along line 5—5 of FIG. 1.

A cribbing structure 111 (FIGS. 1 and 5) is provided to protect the screen and the inlet and also to provide a lower bearing support for the screen 10 which is rotated clockwise, as viewed in FIG. 5. The cribbing structure includes a wedge-shaped structure pointed upstream and constructed of plank 112 supported by piles 114 of the pier, the wedge-shaped structure formed by the planks 112 deflecting any large objects coming down the river away from the screen and the inlet pipe. The cribbing structure also includes carrier members 116 which support a further carrying frame 118 carrying arcuate combined stop and bearing segments 120 adjustably thereon, which normally are spaced slightly from the screen 10 to permit tilting movement of the screen relative to the frame 118 within limits. During normal conditions, the segments 120 are not engaged by the screen but do act as bearings when the screen is subjected to a sudden surge of water flow as might occur from the propeller of a ship in the vicinity of the pump, the segments 120 and resilient suspension of the screen permitting the tilting within limits to dissipate the shock of such a surge. Thus, the cribbing structure protects the cylinder and also acts as a lower limit bearing for the screen 10.

Figure 6:
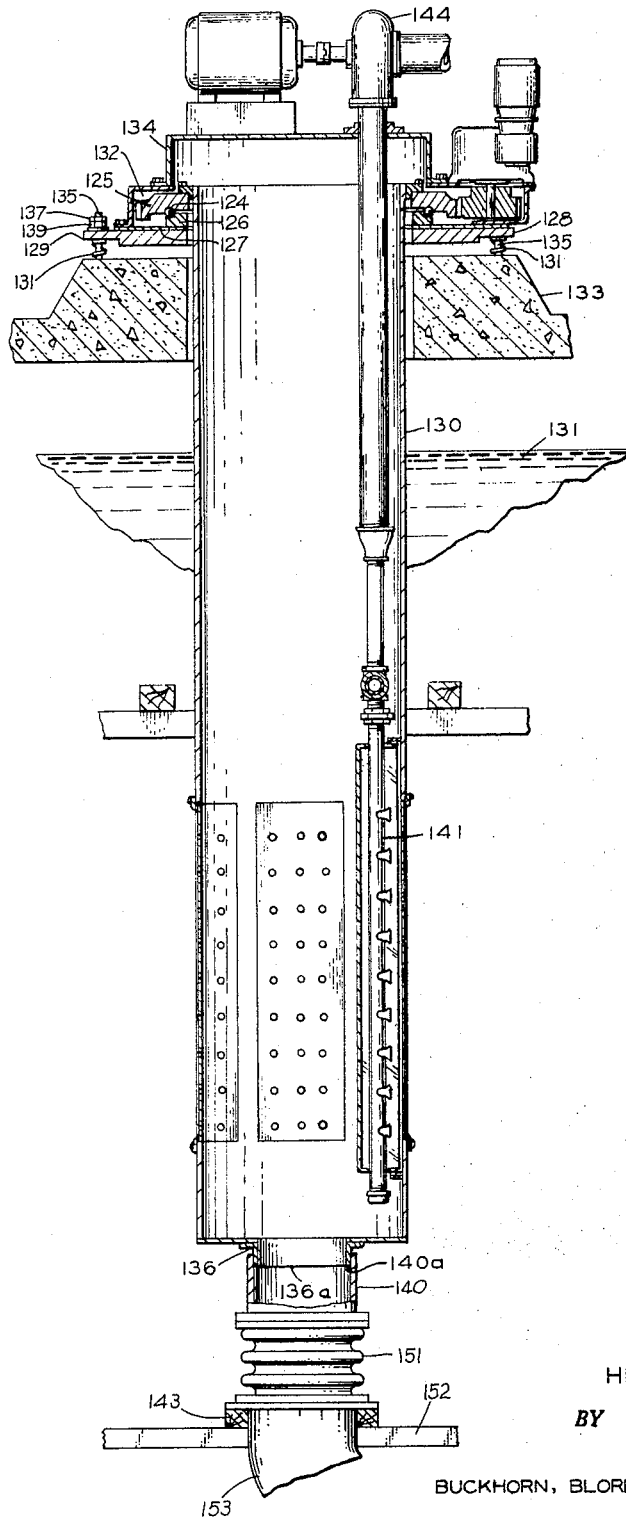
FIG. 6 is an enlarged, vertical, sectional view of a water supply inlet structure forming an alternate embodiment of the invention.

In the embodiment of the invention shown in FIG. 6 the screen 130 is supported resiliently in a lake or stream 131 from a suitable platform 133 by radial-and-thrust bearing structure 132 covered by a cup-shaped housing 134. The bearing structure 132 includes balls 124, an upper, outer race member and ring gear 125 and a lower, inner race member 126 fixed to plate 127 which is fixed to annular supporting plate 128. The plate 128 has radial segments 129 supported by compression springs 131 and slidable on studs 135. Nuts 137 and washers 139 on the studs 135 limit upward movement of the plate 128 relative to the support 133. With nuts 137 engaging and holding plate 128 on the springs 131, just as in the apparatus of FIG. 1, the nuts may be set by turning to adjust the level of plate 128 so that the axis of bearing 132 is vertical or passes through the center of the upper end of pipe 140 in which the lower end of the screen is journaled. The nuts 137 are not fixed to the plate 128 so that the plate 128 is allowed some tilting motion on springs 131 to follow any small angularity of the axis of the screen which might otherwise tend to impose an unequally distributed weight on bearing 132. The screen 130, its drive and the upper bearing structure 132 are generally similar to the corresponding elements of the structure shown in FIGS. 1 to 5. However, lower bearing of the screen 130 differs from that of the lower radial bearing of the screen 10 as will be brought out below. The lower end of the screen 130 has a flanged ring 136 fixed in sealed engagement with the bottom of the screen 130 to define an unscreened and completely unobstructed outlet opening in the central portion of the bottom of the screen 130. Flange 136a of the member 136 projects into and is radially journaled in the upper end 140a of an inlet pipe 140 of a pump (not shown) positioned at some remote location such as on the bank of the river or lake 131. Also in this instance, scrubbing structure 141 is supported within the screen 130 from the housing 134 and is supplied with high pressure water by an auxiliary pump 144. The structure 141 has nozzle and shield structure identical with the nozzles 74 and 75 and shield 68 of the embodiment shown in FIGS. 1 to 5. The structure 141 is rigid so that the structure cannot shift or swing inside the screen 130. If desired, the structure 141 may be less rigid and suitable bracing provided to prevent shifting and swinging.

The inlet pipe 140 is supported in a rigid position on cribbing 152 by a resilient bellows pipe structure 151 and a flanged elbow 153 supported by a support 143 fixed to the cribbing. The resilient pipe structure 151 permits tilting movement of the screen 130 within limits also. The cribbing 152 is similar to the cribbing 111 so as to protect the inlet structure against large objects in the body of water. The screen 130 is revolved by the ring gear and pinion structure 132 and has jets of high pressure water projected through the scrubber portion thereof, preferably at the downstream side of the screen, with the shield being interposed between the portions of the screen being scrubbed and the inlet end of the pipe 140 so that debris and sediment scrubbed or jetted off the screen by the nozzles is carried away by the flow of the river before it can get back into the screen to the inlet pipe 140.

It is to be understood that the above-described arrangements are simply illustrative of the application of the principles of the invention. Numerous other arrangements may be readily devised by those skilled in the art which will embody the principles of the invention and fall within the spirit and scope thereof.

I claim:
1. In a water supply inlet structure
   (a) an annular supporting member,
   (b) resilient means for mounting and supporting the member in a horizontal position over a body of water,
   (c) a pump motor and pump detachably mounted on and supported by said supporting member in a position above said supporting member, said pump having an inlet and an outlet,
   (d) a pump conduit having an outlet portion and an inlet portion, said conduit supported by said supporting member in a position in which the inlet portion extends downwardly from the member into said body of water,
   (e) an annular ring gear,
   (f) radial and thrust bearing means detachably supporting said ring gear concentrically on said supporting member,
   (g) a cylindrical screen secured to and solely supported by the ring gear in a position in which the screen surrounds the pump conduit and extends downwardly into said body of water,
   (h) said cylindrical screen having a closed lower end, said closed lower end being spaced apart from and below the inlet portion of said pump conduit,
   (i) a pinion mounted on and supported by said supporting member for driving the ring gear to rotate the screen,
   (j) motor means detachably mounted above, on, and supported by said support member for driving said pinion,
   (k) screen flushing means supported by the pump conduit,
   (l) bleeding means connecting the outlet of said pump to said screen flushing means,
   (m) an outlet pipe,
   (n) flexible pipe means coupling the outlet of the pump to said outlet pipe,
   (o) cribbing means positioned below said support member,
   (p) and additional bearing means carried by said cribbing means and loosely surrounding the lower portion of said screen to permit limited lateral deflections of the screen relative to the vertical.

2. In a water supply inlet structure,
   (a) an annular supporting member,
   (b) resilient means for supporting and mounting the member in a horizontal position over a body of water,
   (c) a pump motor and pump detachably mounted on and supported by said supporting member in a position above said supporting member, said pump having an inlet and an outlet,
   (d) a pump conduit having an outlet portion and an inlet portion, said conduit supported by said supporting member in a position in which the inlet portion extends downwardly from said supporting member into said body of water,
   (e) an annular ring gear,
   (f) radial and thrust bearing means detachably supporting said ring gear concentrically on said supporting member,
   (g) a cylindrical screen secured to and solely supported by said ring gear in a position in which the screen surrounds the pump conduit and extends downwardly into said body of water,
   (h) said cylindrical screen having a closed lower end, said closed lower end being spaced apart from and below the inlet portion of said pump conduit,
   (i) a pinion mounted on and supported by said supporting member for driving the ring gear to rotate the screen,
   (j) motor means detachably mounted above, on, and supported by said support member for driving said pinion,
   (k) an outlet pipe,
   (l) flexible means connecting said outlet pipe to the outlet of said pump,
   (m) cribbing means positioned below said support member and additional bearing means carried by said cribbing means and loosely surrounding the lower portion of said screen to prevent lateral deflections of the screen relative to the vertical.

References Cited by the Examiner

UNITED STATES PATENTS

| | | | |
|---|---|---|---|
| 95,924 | 10/1869 | Molinier | 210—540 X |
| 184,427 | 11/1876 | Riddle | 210—391 X |
| 538,461 | 4/1895 | Noble. | |
| 682,994 | 9/1901 | Parsons | 210—161 |
| 693,354 | 2/1902 | Parker | 210—393 X |
| 869,720 | 10/1907 | Patthias. | |
| 916,481 | 3/1909 | Noyes | 210—391 X |
| 993,839 | 5/1911 | Keyes | 210—391 |
| 1,219,796 | 3/1917 | Atkins | 210—391 X |
| 1,513,878 | 11/1924 | Anthony | 210—161 X |
| 1,516,693 | 11/1924 | Anthony | 210—158 X |
| 1,838,046 | 12/1931 | Welser | 210—393 |
| 1,992,005 | 2/1935 | Goldsborough | 210—158 |
| 2,167,322 | 7/1939 | Cuno et al. | 210—407 X |
| 2,197,509 | 4/1940 | Reilly et al. | 210—402 |
| 2,225,167 | 9/1941 | Hunn | 210—407 X |
| 2,354,623 | 7/1944 | Tietig | 210—411 X |
| 2,685,235 | 8/1954 | Lindblad | 210—391 X |
| 2,720,844 | 10/1955 | Bodine | 103—219 |
| 2,835,390 | 5/1958 | King | 210—82 X |
| 2,842,208 | 7/1958 | Dukes | 103—219 X |
| 3,002,400 | 10/1961 | Scott. | |
| 3,060,663 | 10/1962 | Morris et al. | 55—400 X |

FOREIGN PATENTS

| | | |
|---|---|---|
| 138,251 | 8/1950 | Australia. |
| 798,568 | 3/1936 | France. |
| 398,306 | 7/1924 | Germany. |
| 620,477 | 10/1934 | Germany. |

(Other references on following page)

FOREIGN PATENTS 954,947 12/1956 Germany.
97,392 11/1939 Sweden.

OTHER REFERENCES

German printed application No. 1,006,396, August 1957.
German printed application No. 1,031,281, June 1958.
German printed application No. 1,089,335, July 1953.

References Cited by the Applicant

UNITED STATES PATENTS

| | | |
|---|---|---|
| 647,648 | 4/1900 | Capron. |
| 706,441 | 8/1902 | McLaughlin. |
| 781,107 | 1/1905 | Stewart. |
| 1,012,974 | 12/1911 | Bird. |
| 1,151,999 | 8/1915 | Bird. |
| 1,512,977 | 10/1924 | De Pue. |
| 1,591,821 | 7/1926 | Heaton. |
| 1,923,138 | 8/1933 | Boynton et al. |
| 1,950,466 | 3/1934 | Wille et al. |
| 2,015,467 | 9/1935 | Beldam. |
| 2,371,760 | 3/1945 | Kinney. |

REUBEN FRIEDMAN, *Primary Examiner.*

ROBERT F. BURNETT, *Examiner.*

D. TALBERT, *Assistant Examiner.*